United States Patent
Yamagami et al.

(10) Patent No.: US 9,777,780 B2
(45) Date of Patent: Oct. 3, 2017

(54) ELECTROMAGNETIC CLUTCH AND MANUFACTURING METHOD THEREOF

(71) Applicant: DENSO CORPORATION, Kariya, Aichi-pref. (JP)

(72) Inventors: Yousuke Yamagami, Obu (JP); Motohiko Ueda, Okazaki (JP); Tooru Ookuma, Anjo (JP); Yasuo Tabuchi, Toyoake (JP); Tomoyuki Mizuguchi, Anjo (JP); Kazunori Mizutori, Toyohashi (JP); Yasuhiro Tamatsu, Toyohashi (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 104 days.

(21) Appl. No.: 14/655,302

(22) PCT Filed: Dec. 10, 2013

(86) PCT No.: PCT/JP2013/007258
§ 371 (c)(1),
(2) Date: Jun. 24, 2015

(87) PCT Pub. No.: WO2014/103206
PCT Pub. Date: Jul. 3, 2014

(65) Prior Publication Data
US 2016/0025159 A1    Jan. 28, 2016

(30) Foreign Application Priority Data
Dec. 26, 2012    (JP) .................................. 2012-282697

(51) Int. Cl.
*F16D 27/00*        (2006.01)
*F16D 27/112*       (2006.01)
*B23P 11/00*        (2006.01)

(52) U.S. Cl.
CPC ............ *F16D 27/004* (2013.01); *B23P 11/00* (2013.01); *F16D 27/112* (2013.01); *B23P 2700/50* (2013.01); *F16D 2027/008* (2013.01)

(58) Field of Classification Search
CPC ... F16D 27/004; F16D 2027/008; B23P 11/00
See application file for complete search history.

(56) References Cited

U.S. PATENT DOCUMENTS

| 4,305,198 A | 12/1981 | Kanamaru et al. |
| 4,413,717 A | 11/1983 | Kanamaru et al. |

(Continued)

FOREIGN PATENT DOCUMENTS

| JP | S55043171 U | 9/1978 |
| JP | S54126852 A | 10/1979 |

(Continued)

OTHER PUBLICATIONS

International Search Report and Written Opinion (in Japanese with English Translation) for PCT/JP2013/007258, mailed Mar. 18, 2014; ISA/JP.

(Continued)

*Primary Examiner* — Stacey Fluhart
(74) *Attorney, Agent, or Firm* — Harness, Dickey & Pierce, P.L.C.

(57) ABSTRACT

A ring insertion groove is formed between adjacent two of circular plates, which are made of a magnetic material and are arranged concentric with each other, and a ring, which is made of a non-magnetic material and has a larger deformation resistance in comparison to the magnetic material of the plates, is press fitted into the ring insertion groove. Thereafter, a peripheral part around an opening of the ring insertion groove is plastically flowed, so that a compression stress is left in the ring.

6 Claims, 5 Drawing Sheets

(56) References Cited

U.S. PATENT DOCUMENTS

| | | | | |
|---|---|---|---|---|
| 4,425,699 | A | * | 1/1984 | Nordin .................. B21K 25/00 277/399 |
| 4,685,202 | A | | 8/1987 | Booth et al. |
| 5,361,883 | A | * | 11/1994 | Yamamoto ............ F16D 27/112 192/84.961 |
| 5,642,560 | A | | 7/1997 | Tabuchi et al. |
| 6,209,191 | B1 | * | 4/2001 | Tabuchi .................. B21H 1/04 192/84.961 |
| 2006/0144666 | A1 | * | 7/2006 | Aikawa ................ F16D 27/115 192/52.3 |
| 2007/0170029 | A1 | * | 7/2007 | Okada .................. F16D 27/112 192/35 |

FOREIGN PATENT DOCUMENTS

| | | |
|---|---|---|
| JP | S55159334 A | 12/1980 |
| JP | S62248587 A | 10/1987 |
| JP | H08114240 A | 5/1996 |
| JP | 2004116764 A | 4/2004 |

OTHER PUBLICATIONS

Office Action dated Dec. 1, 2015 issued in the corresponding JP application No. 2012-282697 in Japanese with English translation.

* cited by examiner 34, 35

34, 35

34a, 35a
34, 35
34b, 35b

_US 9,777,780 B2_

ELECTROMAGNETIC CLUTCH AND MANUFACTURING METHOD THEREOF

CROSS REFERENCE TO RELATED APPLICATIONS

This application is a U.S. National Phase Application under 35 U.S.C. 371 of International Application No. PCT/JP2013/007258 filed on Dec. 10, 2013 and published in Japanese as WO 2014/103206 A1 on Jul. 3, 2014. This application is based on and claims the benefit of priority from Japanese Patent Application No. 2012-282697 filed on Dec. 26, 2012. The entire disclosures of all of the above applications are incorporated herein by reference.

TECHNICAL FIELD

The present disclosure relates to an electromagnetic clutch and a manufacturing method thereof.

BACKGROUND ART

A known electromagnetic clutch includes a rotor, which is rotated by a rotational drive force outputted from a drive source, and an armature, which is rotated when the armature is attracted to and is coupled with the rotor by a magnetic force.

In order to improve a magnetic efficiency, each of the rotor and the armature is formed such that a plurality of circular plates, which are made of a magnetic material, is concentrically placed about a rotational axis, and an annular ring, which is made of a non-magnetic material, is placed between adjacent two of the circular plates (see, for example, Patent Literature 1).

More specifically, a ring insertion groove is formed in an inner peripheral surface or an outer peripheral surface of each corresponding plate, and the ring is inserted between the adjacent plates. Thereafter, the ring is pressed with a die to plastically flow the ring into the ring insertion groove, so that the adjacent plates and the ring are joined with each other.

However, in the above-described prior art electromagnetic clutch, it is required to have a predetermined remaining straining force in the non-magnetic ring, which has been plastically flowed, in order to satisfy a predetermined mechanical strength with respect to shearing, compressing, bending or the like. Therefore, the ring insertion groove needs to have a complex shape, so that the processing of the ring insertion groove is not easy.

Furthermore, in order to plastically flow the ring, the material of the ring has a smaller deformation resistance in comparison to a material of the plates. That is, the ring can be easily deformed. Therefore, the ring may be easily deformed by a load, which is applied to the ring and/or the plates by a belt in a direction perpendicular to a rotational axis, and thereby a crack may be disadvantageously formed in the ring.

CITATION LIST

Patent Literature

PATENT LITERATURE 1: JPS54-126852A (corresponding to U.S. Pat. No. 4,305,198A and U.S. Pat. No. 4,413,717A)

SUMMARY OF INVENTION

The present disclosure is made in view of the above points. It is an objective of the present disclosure to provide an electromagnetic clutch and a manufacturing method thereof, which can achieve at least one of easing processing of a ring inserting groove and limiting of crack generation in a ring made of a non-magnetic material.

In order to achieve the above objective, according to the present disclosure, there is provided an electromagnetic clutch including a driving-side rotatable body, which is rotated by a rotational drive force outputted from a drive source, and a driven-side rotatable body that is rotated by the rotational drive force transmitted from the driving-side rotatable body when the driven-side rotatable body is attracted to and is coupled with the driving-side rotatable body with an electromagnetic force. At least one of the driven-side rotatable body and the driving-side rotatable body includes: a plurality of plates, which are respectively configured into a circular plate form and are made of a magnetic material, wherein the plurality of plates is concentric with each other; and a ring, which is made of a non-magnetic material having a deformation resistance that is larger than a deformation resistance of the magnetic material of the plurality of plates, wherein the ring is placed between adjacent two of the plurality of plates. Furthermore, the adjacent two of the plurality of plates and the ring are joined together while leaving a compression stress in the ring by plastically flowing the magnetic material of the adjacent two of the plurality of plates.

Also, according to the present disclosure, there is provided a manufacturing method of an electromagnetic clutch that transmits a drive force between two rotatable bodies, each of which is rotatable about a rotational axis and has a friction surface, through urging and contacting of the friction surfaces of the two rotatable bodies with each other by an electromagnetic force. In this manufacturing method, a rotatable body main portion, which is made of a magnetic material and forms a portion of one of the two rotatable bodies, and a ring, which is made of a non-magnetic material having a deformation resistance larger than a deformation resistance of the magnetic material of the rotatable body main portion and forms a portion of the one of the two rotatable bodies, are prepared. Furthermore, a ring insertion groove, which is configured into an annular form, is formed in the rotatable body main portion, such that the ring insertion groove is concentric with the rotational axis and opens only on one end side of the rotatable body main portion in a direction of the rotational axis. Next, the ring is inserted into the ring insertion groove. Then, the magnetic material of the rotatable body main portion located around the opening of the ring insertion groove is plastically flowed in such a manner that a compression stress is left in the ring. Thereafter, an excess portion of the magnetic material of the rotatable body main portion is removed at another end side of the rotatable body main portion, which is opposite from the one end side in the direction of the rotational axis, up to a point where the ring is exposed from the magnetic material of the rotatable body main portion, and thereby the friction surface of the one of the two rotatable bodies is formed in the rotatable body main portion.

DESCRIPTION OF EMBODIMENTS

An embodiment of the present disclosure will be described.

An electromagnetic clutch of the present embodiment is used to intermittently conduct a rotational drive force, which is outputted from an engine (a drive source) of a vehicle, to a refrigerant compressor at a vehicle air conditioning system.

Figure 1:
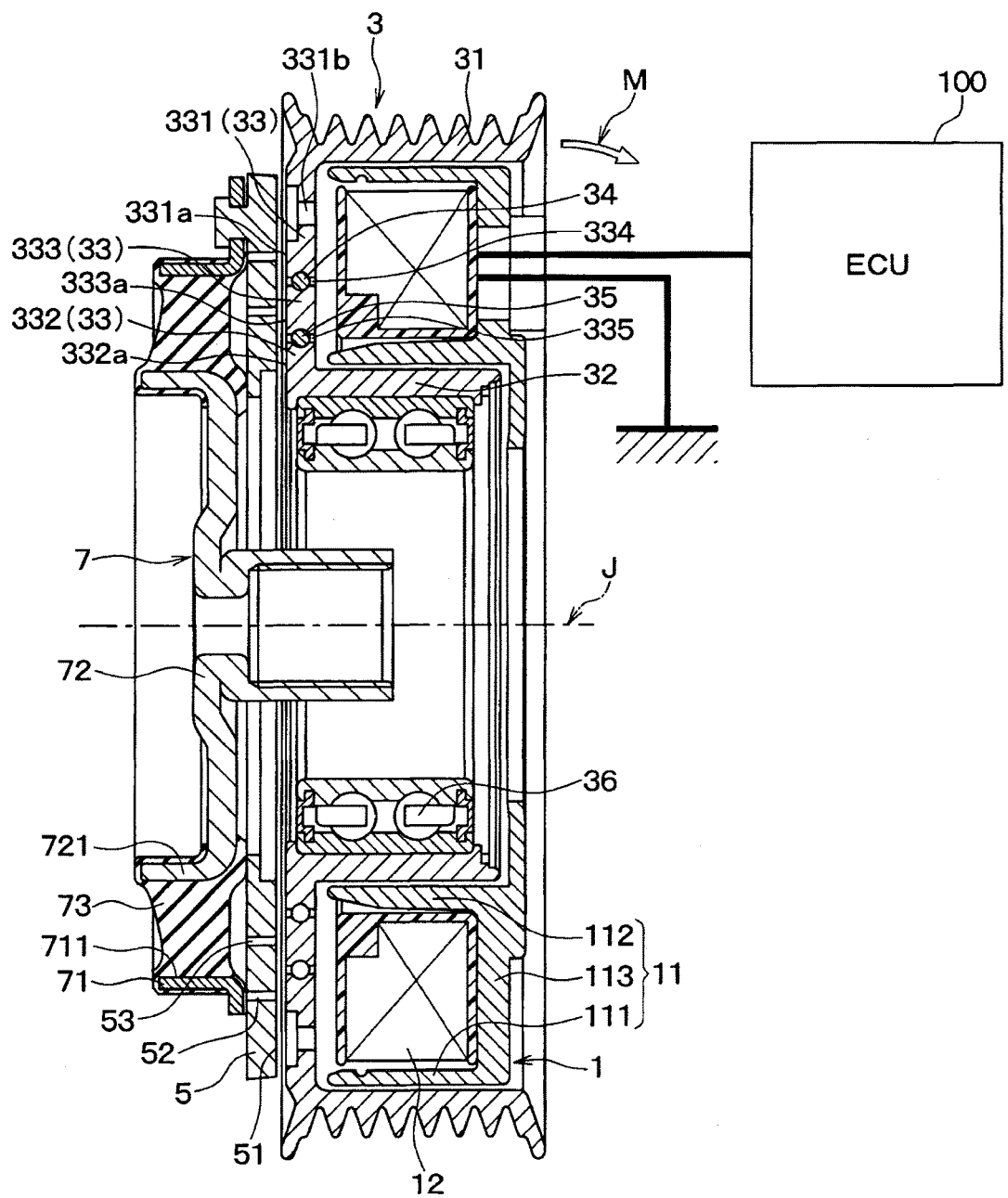
FIG. 1 is a cross sectional view of an electromagnetic clutch according to an embodiment of the present invention.

As shown in FIG. 1, the electromagnetic clutch includes an electromagnet 1, a rotor 3, an armature 5 and a hub 7 and is rotated about a rotational axis J.

The electromagnet 1 includes a stator 11 and a coil 12. The electromagnet 1 generates an electromagnetic force upon energization of the coil 12 to couple between the rotor 3 and the armature 5.

The stator 11 is made of a magnetic material (specifically, iron). Furthermore, the stator 11 includes a stator-outer-side cylindrical tubular portion 111, a stator-inner-side cylindrical tubular portion 112, and a stator-end surface portion 113. The stator-outer-side cylindrical tubular portion 111 is configured into a cylindrical tubular form and is placed coaxially with the rotational axis J. The stator-inner-side cylindrical tubular portion 112 is configured into a cylindrical tubular form. The stator-inner-side cylindrical tubular portion 112 is placed on a radially inner side of the stator-outer-side cylindrical tubular portion 111 and is placed coaxially with the rotational axis J. The stator-end surface portion 113 is configured into a circular plate form and extends in a direction perpendicular to the rotational axis J such that the stator-end surface portion 113 connects between one axial end of the stator-outer-side cylindrical tubular portion 111 and one axial end of the stator-inner-side cylindrical tubular portion 112. The stator-end surface portion 113 has a through-hole, which is configured into a circular form and extends through the stator-end surface portion 113 from a front side to a back side of the stator-end surface portion 113 at a center part of the stator-end surface portion 113.

Specifically, the stator 11 is configured to have a double cylindrical structure. An axial cross-section of the stator 11 forms two U-shaped sections, which are symmetrical about the rotational axis J. A cylindrical space is formed by an inner peripheral surface of the stator-outer-side cylindrical tubular portion 111, an outer peripheral surface of the stator-inner-side cylindrical tubular portion 112, and an inner surface of the stator-end surface portion 113. The coil 12 is received in this cylindrical space.

The coil 12 is fixed in a state where the coil 12 is insert molded in a dielectric resin material (e.g., epoxy resin). The coil 12 is electrically insulated relative to the stator 11.

One end of the coil 12 is electrically grounded to the vehicle, and the other end of the coil 12 is connected to an electronic control unit (ECU) 100 of the air conditioning system. The electronic control unit 100 executes a control operation that changes between energization and deenergization of the coil 12.

The rotor 3 includes a rotor-outer-side cylindrical tubular portion 31, a rotor-inner-side cylindrical tubular portion 32, a rotor-end surface portion 33 and annular rings 34, 35. The rotor-outer-side cylindrical tubular portion 31 is configured into a cylindrical tubular form and is placed coaxially with the rotational axis J. The rotor-inner-side cylindrical tubular portion 32 is configured into a cylindrical tubular form. The rotor-inner-side cylindrical tubular portion 32 is placed on a radially inner side of the rotor-outer-side cylindrical tubular portion 31 and is placed coaxially with the rotational axis J. The rotor-end surface portion 33 is configured into a circular plate form and extends in the direction perpendicular to the rotational axis J such that the rotor-end surface portion 33 connects between one axial end of the rotor-outer-side cylindrical tubular portion 31 and one axial end of the rotor-inner-side cylindrical tubular portion 32. The rotor-end surface portion 33 has a through-hole, which is configured into a circular form and extends through the rotor-end surface portion 33 from a front side to a back side of the rotor-end surface portion 33 at a center part of the rotor-end surface portion 33.

Specifically, the rotor 30 is configured to have a double cylindrical structure. An axial cross-section of the rotor 30 forms two U-shaped sections, which are symmetrical about the rotational axis J. A cylindrical space is formed by an inner peripheral surface of the stator-outer-side cylindrical tubular portion 31, an outer peripheral surface of the rotor-inner-side cylindrical tubular portion 32, and an inner surface of the rotor-end surface portion 33. The electromagnet 1 is received in this cylindrical space.

The rotor-outer-side cylindrical tubular portion 31, the rotor-inner-side cylindrical tubular portion 32, and the rotor-end surface portion 33 are made of a magnetic material (specifically, low-carbon steel) and form a magnetic circuit for an electromagnetic force generated by the electromagnet 1.

The rotor-end surface portion 33 is formed by a plurality of plates 331-333, each of which is configured into a circular plate form and is placed concentrically with the rotational axis J. Specifically, the rotor-end surface portion 33 includes a rotor-outer-side plate 331, a rotor-inner-side plate 332, and a rotor-intermediate plate 333. The rotor-outer-side plate 331 is connected to the rotor-outer-side cylindrical tubular portion 31. The rotor-inner-side plate 332 is connected to the rotor-inner-side cylindrical tubular portion 32. The rotor-intermediate plate 333 is placed between the rotor-outer-side plate 331 and the rotor-inner-side plate 332.

A rotor friction surface 331a-333a, which contacts the armature 5 at a time of coupling between the rotor 3 and the armature 5, is formed at an armature 5 side of each of the plates 331-333 (i.e., a side of each of the plates 331-333, which is opposite from the electromagnet).

A plurality of rotor slit holes 331b, each of which is configured into an arcuate form in a view taken in the axial direction, is formed in the rotor-outer-side plate 331 such that the rotor slit holes 331b are arranged one after another in a circumferential direction of the rotor-outer-side plate 331. The rotor slit holes 331b extend through the rotor-outer-side plate 331 from a front side to a back side of the rotor-outer-side plate 331.

An outer-side ring insertion groove 334, which is configured into an annular form, is formed between the rotor-outer-side plate 331 and the rotor-intermediate plate 333. An inner-side ring insertion groove 335, which is configured into an annular form, is formed between the rotor-inner-side plate 332 and the rotor-intermediate plate 333. The outer-side ring 34 is placed in the outer-side ring insertion groove 334, and the inner-side ring 35 is placed in the inner-side ring insertion groove 335.

Figure 2:
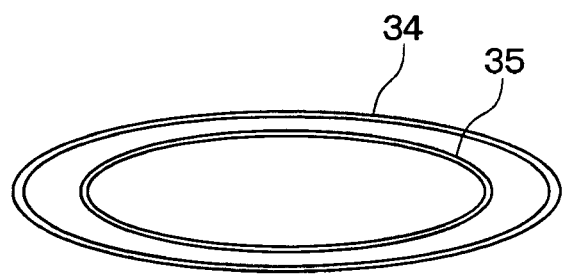
FIG. 2 is a perspective view of rings of FIG. 1.

These rings 34, 35 are made of a non-magnetic material (specifically, SUS304) that has a larger deformation resistance in comparison to a material of the plates 331-333. Furthermore, as shown in FIG. 2, each of the rings 34, 35 is configured into a circumferentially continuous form without being cut. Furthermore, as shown in FIGS. 4(b) to 4(d), a shape of a cross section of each ring 34, 35 is a circle. Here, the circle refers to a generally perfect circle and may include a circle that is within a predetermined tolerance range in terms of the shape of the circle.

As shown in FIG. 1, a V-groove (specifically, a poly-V-groove), around which a V-belt (not shown) is wound, is formed in an outer peripheral surface of the rotor-outer-side cylindrical tubular portion 31. The V-belt transmits the rotational drive force, which is outputted from the engine, to the rotor 3.

An outer peripheral side of a ball bearing 36 is fixed to an inner peripheral side of the rotor-inner-side cylindrical tubular portion 32. A boss portion (not shown), which is configured into a cylindrical tubular form and projects toward the electromagnetic clutch side from a housing that forms an outer shell of the refrigerant compressor (not shown), is fixed to an inner peripheral side of the ball bearing 36. In this way, the rotor 3 is fixed to the housing of the refrigerant compressor in a manner that enables rotation of the rotor 3. The rotor 3 serves as a driving-side rotatable body or a rotatable body of the present disclosure.

The armature 5 is a member that is configured into a circular plate form. The armature 5 extends in the direction perpendicular to the rotational axis and has a through-hole, which is configured into a circular form and extends through the armature 5 from a front side to a back side of the armature 5 at a center part of the armature 5. An armature friction surface 51, which contacts the rotor friction surfaces 331a-333a at the time of coupling between the rotor 3 and the armature 5, is formed at the rotor 3 side of the armature 5. The armature 5 is made of a magnetic material (specifically, low carbon steel) and forms the magnetic circuit for the electromagnetic force generated by the electromagnet 1. The armature 5 serves as a driven-side rotatable body or a rotatable body of the present disclosure.

A plurality of armature slit holes 52, 53, which are respectively configured into an arcuate form and are arranged in two rows in the radial direction in a view taken in the axial direction, is formed in the armature 5 such that corresponding ones of the armature slit holes 52, 53 are arranged one after another in a circumferential direction of the armature 5 in each corresponding row. The armature slit holes 52, 53 extend through a pulley-end surface portion 33 from a front side to a back side of the pulley-end surface portion 33.

The outer-side armature slit holes 52, which are located at a radially outer side, are positioned between the rotor slit holes 331b and the outer-side ring insertion groove 334. Specifically, the outer-side armature slit holes 52 are placed on a radially inner side of the rotor slit holes 331b and on a radially outer side of the outer-side ring insertion groove 334.

The inner-side armature slit holes 53, which are located at a radially inner side, are positioned between the outer-side ring insertion groove 334 and the inner-side ring insertion groove 335. Specifically, the inner-side armature slit holes 53 are placed on a radially inner side of the outer-side ring insertion groove 334 and on a radially outer side of the inner-side ring insertion groove 335.

The hub 7 couples between the armature 5 and the refrigerant compressor and includes an outer hub 71, an inner hub 72, and a damper 73.

A planar portion is formed at the side of the armature 5, which is opposite from the rotor 3, and the outer hub 71 is fixed to this planar portion by, for example, rivets. The inner hub 72 is joined to a shaft of the refrigerant compressor.

The outer hub 71 and the inner hub 72 have cylindrical tubular portions 711, 721, respectively, which extend in the direction of the rotational axis. The damper 73, which is configured into a cylindrical tubular form and is made of rubber, is vulcanized and is bonded to the cylindrical tubular portion 711 of the outer hub 71 and the cylindrical tubular portion 721 of the inner hub 72.

In this way, the armature 5, the outer hub 71, the damper 73, the inner hub 72 and the shaft of the refrigerant compressor are joined together. Thereby, when the rotor 3 and the armature 5 are coupled with each other, the armature 5, the hub 7 and the shaft of the refrigerant compressor are rotated together with the rotor 3.

Furthermore, the damper 73 exerts a resilient force to the outer hub 71 in a direction away from the rotor 3. When the coil 12 is not energized, a gap is formed by this resilient force at a location between the rotor friction surfaces 331a-333a and the armature friction surface 51.

Next, an operation according to the present embodiment will be described. In a case where the electronic control unit 100 does not output a control voltage, and thereby the electromagnet 1 is placed into the deenergized state, the electromagnet 1 does not generate the electromagnetic force. Thereby, the rotor 3 and the armature 5 are decoupled from each other by the resilient force of the damper 73. Thus, the rotational drive force of the engine is not transmitted to the refrigerant compressor. As a result, a refrigeration cycle system is not operated.

In a case where the electronic control unit 100 outputs the control voltage to place the electromagnet 1 into the energized state, the electromagnetic force, which is generated from the electromagnet 1, becomes larger than the resilient force of the damper 73. Thus, the armature 5 is attracted to the rotor 3, and thereby the rotor friction surfaces 331a-333a are urged against to the armature friction surface 51. As a result, the rotor 3 and the armature 5 are coupled with each other. Thus, the rotational drive force of the engine is transmitted to the refrigeration compressor through the rotor 3, the armature 5, and the hub 7. In this way, the refrigeration cycle system is operated.

Figure 3:
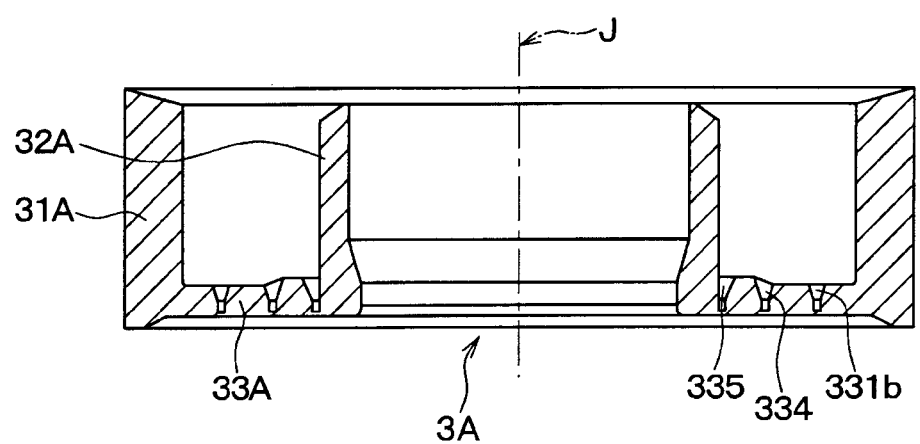
FIG. 3 is a cross-sectional view showing a shape of a rotor of FIG. 1 before a time of processing.
Figure 4:
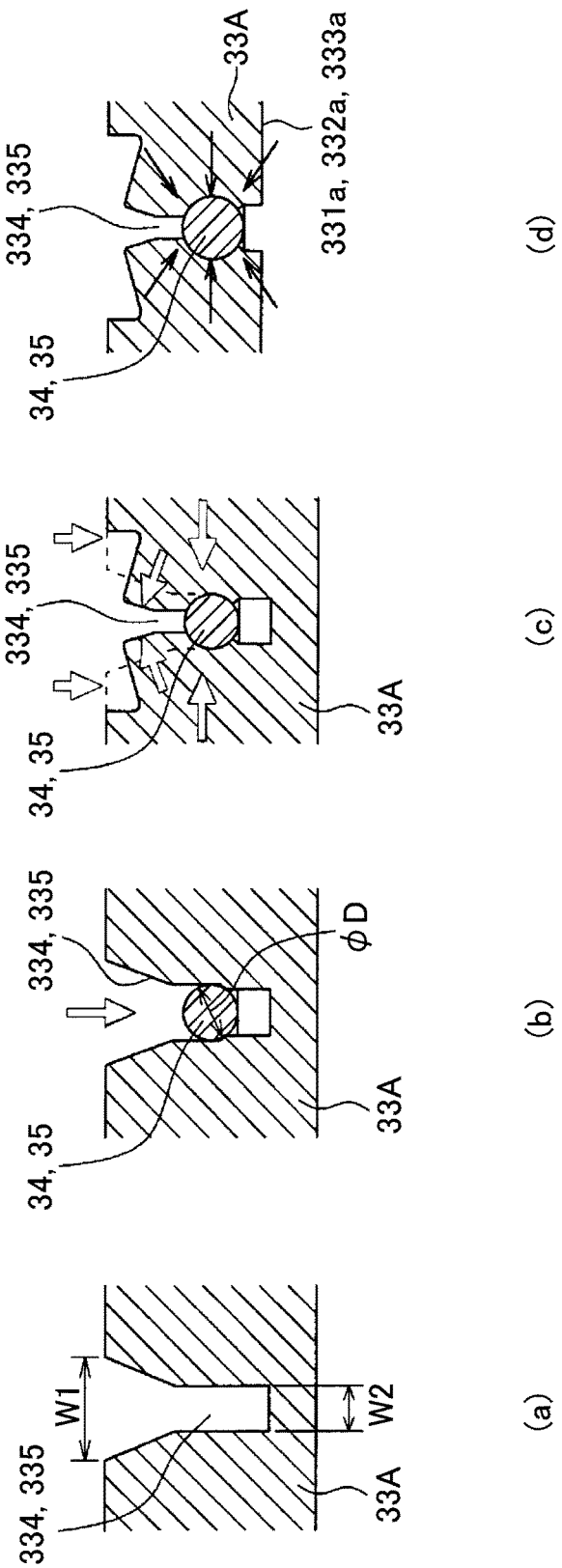
FIGS. 4(a)-4(d) are cross-sectional views showing key features of manufacturing steps of the rotor of FIG. 1.

Next, a manufacturing method of the rotor 3 will be described with reference to FIGS. 3 to 4(d).

First of all, the rings 34, 35 and a rotor preform 3A are prepared. The rotor preform 3A serves as a rotatable body main portion made of a magnetic material. As shown in FIG. 3, the rotor preform 3A includes a rotor preform outer-side cylindrical tubular portion 31A, a rotor preform inner-side cylindrical tubular portion 32A, and a rotor preform end surface portion 33A. The rotor preform outer-side cylindrical tubular portion 31A is processed to form the rotor-outer-side cylindrical tubular portion 31 through processing steps described later. The rotor preform inner-side cylindrical tubular portion 32A is processed to form the rotor-inner-side cylindrical tubular portion 32 through the processing steps described later. The rotor preform end surface portion 33A is processed to form the rotor-end surface portion 33 through the processing steps described later.

Next, the rotor slit holes 331b, the outer-side ring insertion groove 334, and the inner-side ring insertion groove 335 are formed in the rotor preform end surface portion 33A by, for example, cutting or coining. At this time point, the rotor slit holes 331b, and the ring insertion grooves 334, 335 are not yet extended through the rotor preform end surface portion 33A from the front side to the back side of the rotor preform end surface portion 33A and are configured to open only at one end side in the direction of the rotational axis (specifically, the side of the rotor preform end surface portion 33A, which is opposite from the rotor friction surface).

As shown in FIG. 4(a), each of the ring insertion grooves 334, 335 at this time point is configured such that a groove width of each ring insertion groove 334, 335, which is measured in the direction perpendicular to the rotational axis (the left-to-right direction in the plane of FIG. 4(a)), progressively decreases from an opening toward a groove bottom of the ring insertion groove 334, 335 and is then kept constant all the way to the groove bottom.

Furthermore, an opening end groove width W1 of an opening end of the ring insertion groove 334, 335 is set to be larger than a wire outer diameter ϕD of the ring 34, 35. Furthermore, a bottom-side groove width W2 of the groove bottom portion of the ring insertion groove 334, 335 is set to be smaller than the wire outer diameter ϕD of the ring 34, 35.

Next, as shown in FIG. 4(b), the ring 34, 35 is press fitted into each ring insertion groove 334, 335. More specifically, the ring 34, 35 is inserted in a corresponding position of the ring insertion groove 334, 335, at which the bottom-side groove width W2 of the ring insertion groove 334, 335 is constant, and the ring 34 35 does not contact the bottom of the ring insertion groove 334, 335.

Thereafter, as shown in FIG. 4(c), a peripheral part around the opening of the ring insertion groove 334, 335 is swaged (i.e., is plastically flowed), so that a compression stress is left in the ring 34, 35.

Next, as shown in FIG. 4(d), an excess material of the rotor preform end surface portion 33A is removed at the other end side (specifically, the rotor friction surface side) of the rotor preform end surface portion 33A, which is opposite from the one end side in the direction of the rotational axis, by, for example, a cutting process up to a point where the ring is exposed from the material of the rotor preform end surface portion 33A, and thereby the rotor friction surfaces 331a-333a are formed at the other end side of the rotor preform end surface portion 33A. Furthermore, the cutting process is performed at the other parts of the rotor preform 3A, so that the rotor 3 is finished into its final form. In this state, each ring 34, 35 is clamped between the corresponding plates 331-333 in a state where the compression stress is left in the ring 34, 35, and thereby the shape of the rotor 3 is maintained.

Thereafter, corresponding portions, which include each contact part between the adjacent two of the plates 331-333 and the corresponding ring 34, 35, are coated by electropainting. In this way, corrosion of the contact part between the adjacent two of the plates 331-333 and the corresponding ring 34, 35 can be prevented or limited.

As discussed above, according to the present embodiment, it is not required to have a complex shape at each ring insertion groove 334, 335, so that the processing of the ring insertion groove 334, 335 is eased.

Furthermore, each ring 34, 35 has the larger deformation resistance in comparison to the plates 331-333, so that it is possible to limit generation of a crack in the ring 34, 35.

Here, it should be noted that each of the rings 34, 35 of the above embodiment may be changed in a manner discussed in the following modifications.

Figure 5:
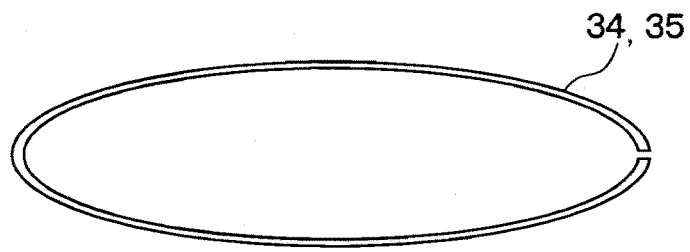
FIG. 5 is a perspective view showing a first modification of the ring of the embodiment.

First of all, as in a first modification shown in FIG. 5, it is possible to use a ring 34, 35, which is cut at one circumferential location. In this instance, the ring 34, 35 can be formed by bending a wire, so that the manufacturing of the ring 34, 35 can be eased.

Figure 6:
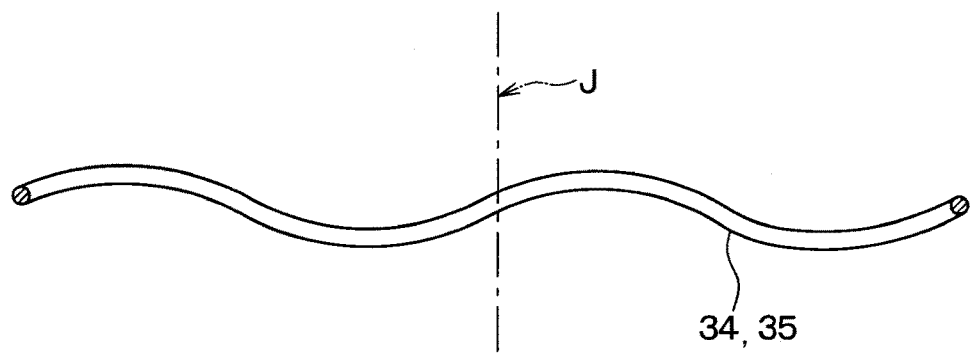
FIG. 6 is a cross-sectional view showing a second modification of the ring of the embodiment.

Furthermore, as in a second modification shown in FIG. 6, it is possible to use a wavy ring 34, 35 that is configured into a form, which is wavy in the direction of the axis J.

A moment, which is indicated by an arrow M in FIG. 1, may be exerted to the rotor-outer-side cylindrical tubular portion 31 and the rotor-outer-side plate 331 due to a load applied to the rotor-outer-side cylindrical tubular portion 31 by the belt in the direction perpendicular to the rotational axis.

A positional deviation may possibly occur between each ring 34, 35 and the corresponding adjacent plates 331, 333 due to the moment M to cause tilting of the rotor-outer-side cylindrical tubular portion 31 and the rotor-outer-side plate 331 relative to the rotor-intermediate plate 333 or tilting of the rotor-intermediate plate 333 relative to the rotor-inner-side plate 332.

However, according to the second modification, an axial position of the contact part between the ring 34, 35 and the corresponding plates 331-333 changes along the circumferential direction, so that the positional deviation between the ring 34, 35 and the corresponding plates 331-333 caused by the moment M does not easily occur.

Figure 7:
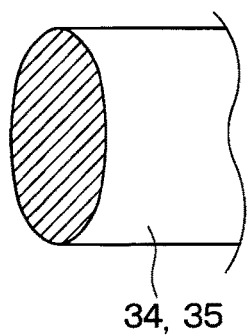
FIG. 7 is a perspective view showing a third modification of the ring of the embodiment.

Furthermore, as in a third modification shown in FIG. 7, it is possible to use a ring 34, 35, which has a cross section that is configured into a shape of an ellipse. In this instance, in comparison to the ring 34, 35 that has the cross section configured into the shape of the circle, an axial length of the contact part between the ring 34, 35 and the corresponding plates 331, 333 can be increased. Therefore, the positional deviation between the ring 34, 35 and the corresponding plates 331-333 caused by the moment M does not easily occur.

Figure 8:
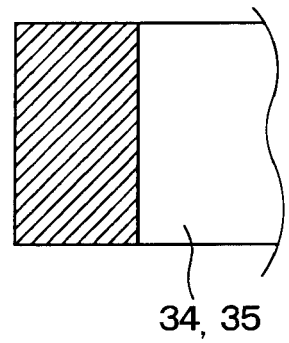
FIG. 8 is a cross-sectional view showing a fourth modification of the ring of the embodiment.
Figure 9:
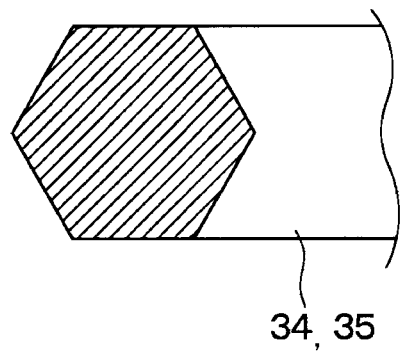
FIG. 9 is a cross-sectional view showing a fifth modification of the ring of the embodiment.

Furthermore, it is possible to use a ring 34, 35 that has a cross section configured into a shape of a polygon. Specifically, as in a fourth modification shown in FIG. 8, it is possible to use a ring 34, 35 that has a cross section configured into a shape of a rectangle. Alternatively, as in a fifth modification shown in FIG. 9, it is possible to use a ring 34, 35 that has a cross section configured into a shape of a hexagon.

In this instance, in comparison to the ring 34, 35 that has the cross section configured into the shape of the circle, an axial length of the contact part between the ring 34, 35 and the corresponding plates 331, 333 can be increased. Therefore, the positional deviation between the ring 34, 35 and the corresponding plates 331-333 caused by the moment M does not easily occur.

Figure 10:
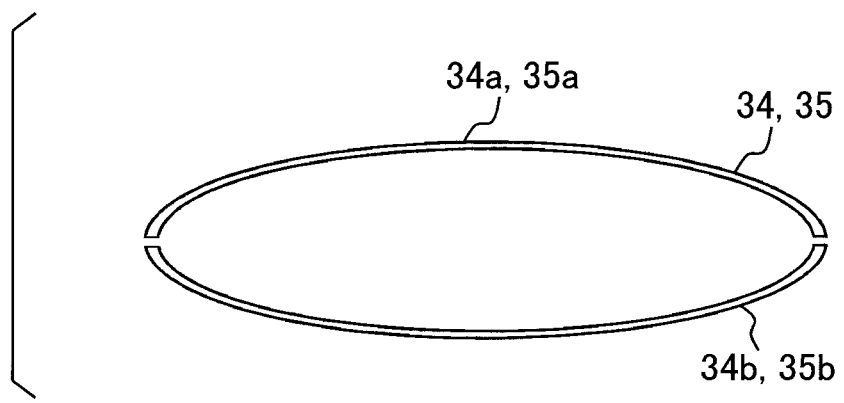
FIG. 10 is a cross-sectional view showing a sixth modification of the ring of the embodiment.

Furthermore, it is possible to use a ring 34, 35 that is divided into a plurality of pieces along a circumferential direction. The axial position of the divided ring 34, 35 may be varied in the ring insertion groove 334, 335, so that the positional deviation between the ring 34, 35 and the corresponding plates 331-333 caused by the moment M does not easily occur. For example, as in a sixth modification shown in FIG. 10, the ring 34, 35 may be divided into two segments 34a, 34b, 35a, 35b.

Other Embodiments

In the above embodiment, the rotor 3 is constructed such that each of the rings 34, 35 is held between the corresponding adjacent two of the plates 331-333. Alternatively, the armature 5 may be divided into a plurality of plates, which are concentrically arranged, and each of the rings may be placed between corresponding two of the divided plates.

The structure for placing each ring between the corresponding plates, which are concentrically placed, may be used only in the rotor 3. Alternately, the structure for placing each ring between the corresponding plates, which are concentrically placed, may be used only in the armature 5. Further alternately, the structure for placing each ring between the corresponding plates, which are concentrically placed, may be used in both of the rotor 3 and the armature 5.

The present disclosure is not limited to the above embodiments, and the above embodiments may be modified in various ways within the scope of the present disclosure recited in the claims.

Furthermore, in each of the above embodiments, some components discussed above may be eliminated unless the components are expressly indicated as indispensable components or are obviously considered as indispensable components in view of the principle of the present disclosure.

Furthermore, in each of the above embodiments, in the case where the number of the component(s), the value, the amount, the range, or the like is specified, the present disclosure is not limited to the number of the component(s), the value, the amount, or the like specified in the embodiment unless the number of the component(s), the value, the amount, or the like is indicated as indispensable or is obviously indispensable in view of the principle of the present disclosure.

Furthermore, in each of the above embodiments, in the case where the shape of the component(s), the positional relationship of the component(s), or the like is specified, the present disclosure is not limited to the shape of the component(s), the positional relationship of the component(s), or the like unless the embodiment specifically states that the shape of the component(s), the positional relationship of the component(s), or the like is necessary, or the embodiment states that the present disclosure is limited in principle to the shape of the component(s), the positional relationship of the component(s), or the like discussed above.

What is claimed is:

1. An electromagnetic clutch comprising:
 a driving-side rotatable body that is rotated by a rotational drive force outputted from a drive source; and
 a driven-side rotatable body that is rotated by the rotational drive force transmitted from the driving-side rotatable body when the driven-side rotatable body is attracted to and is coupled with the driving-side rotatable body with an electromagnetic force, wherein:
 at least one of the driven-side rotatable body and the driving-side rotatable body includes:
 a plurality of plates, which are respectively configured into a circular plate form and are made of a magnetic material, wherein the plurality of plates is concentric with each other; and
 a ring, which is made of a non-magnetic material having a deformation resistance that is larger than a deformation resistance of the magnetic material of the plurality of plates, wherein the ring is placed between adjacent two of the plurality of plates;
 the adjacent two of the plurality of plates and the ring are joined together while the magnetic material of each of the adjacent two of the plurality of plates is plastically deformed to leave a compression stress in the ring; and
 the adjacent two of the plurality of plates clamp a radially outer portion and a radially inner portion of the ring, which are opposed to each other in a radial direction of a rotational axis of the driving-side rotatable body and of the driven-side rotatable body, from two opposite radial sides of the ring in the radial direction and also from two opposite axial sides of the ring in an axial direction of the rotational axis, so that the ring joins between the adjacent two of the plurality of plates in a state where the compression stress is left in the ring.

2. The electromagnetic clutch according to claim 1, wherein the ring is cut at one circumferential location of the ring.

3. The electromagnetic clutch according to claim 1, wherein a cross section of the ring, which is perpendicular to a circumferential direction, is configured into a shape of an ellipse or polygon.

4. The electromagnetic clutch according to claim 1, wherein a cross section of the ring, which is perpendicular to a circumferential direction, is configured into a shape of a circle.

5. The electromagnetic clutch according to claim 1, wherein the ring is divided into a plurality of pieces along a circumferential direction.

6. The electromagnetic clutch according to claim 1, wherein a contact part between the adjacent two of the plurality of plates and the ring is coated by electropainting.

* * * * *